US012008862B2

(12) United States Patent
Inamdar et al.

(10) Patent No.: US 12,008,862 B2
(45) Date of Patent: Jun. 11, 2024

(54) SPORTING EVENT WAGERING RECOMMENDATIONS

(71) Applicant: IGT, Las Vegas, NV (US)

(72) Inventors: Prasad Inamdar, San Francisco, CA (US); Praveenkumar Krishnan Nair, Fremont, CA (US); Rajat Khanda, Fremont, CA (US)

(73) Assignee: IGT, Las Vegas, NV (US)

( * ) Notice: Subject to any disclaimer, the term of this patent is extended or adjusted under 35 U.S.C. 154(b) by 121 days.

(21) Appl. No.: 17/557,761

(22) Filed: Dec. 21, 2021

(65) Prior Publication Data

US 2023/0196871 A1 Jun. 22, 2023

(51) Int. Cl.
*G07F 17/32* (2006.01)
*G06Q 50/34* (2012.01)

(52) U.S. Cl.
CPC ........... *G07F 17/323* (2013.01); *G06Q 50/34* (2013.01); *G07F 17/3211* (2013.01); *G07F 17/3237* (2013.01); *G07F 17/3288* (2013.01)

(58) Field of Classification Search
CPC ............... G07F 17/323; G07F 17/3211; G07F 17/3237; G07F 17/3288; G06Q 50/34
See application file for complete search history.

(56) References Cited

U.S. PATENT DOCUMENTS 5,749,785 A 5/1998 Rossides
6,394,895 B1 5/2002 Mino
7,774,259 B1 8/2010 Satterfield et al.
8,025,565 B2 9/2011 Leen et al.
8,099,182 B1 1/2012 Kasten
8,167,309 B1 5/2012 Laut
8,764,553 B2 7/2014 Ginsberg et al.
9,295,908 B2 3/2016 Froy et al.
9,619,759 B2 4/2017 Pitaliya
9,773,382 B1 9/2017 Korner
9,911,270 B2 3/2018 Larocca et al.
10,255,748 B2 4/2019 English
10,431,042 B2 10/2019 Arnone et al.
10,957,152 B2 3/2021 Jordan
10,970,965 B2 4/2021 Burillo et al.
2001/0047291 A1 11/2001 Garahi et al.
2002/0054088 A1 5/2002 Tanskanen et al.
2002/0065566 A1 5/2002 Aronson et al.
2002/0073021 A1 6/2002 Ginsberg et al.
2002/0155885 A1 10/2002 Shvili
2003/0224854 A1 12/2003 Joao
2004/0048656 A1 3/2004 Krynicky
2004/0078208 A1 4/2004 Burwell
2005/0116410 A1 6/2005 Vlazny et al.
2005/0176507 A1 8/2005 Ephrati et al.
2006/0121970 A1 6/2006 Khal
2007/0022025 A1 1/2007 Litman et al.
2008/0026830 A1 1/2008 Laut
2008/0058043 A1 3/2008 Amaitis et al.
2008/0207310 A1 8/2008 Mindes
2009/0061978 A1 3/2009 Ahlin
2009/0264190 A1 10/2009 Davis et al.
(Continued)

*Primary Examiner* — Kevin Y Kim
(74) *Attorney, Agent, or Firm* — Neal, Gerber & Eisenberg LLP

(57) ABSTRACT

A system that causes an automatic publication of one or more sporting event wagers to a user based on zero, one or more attributes of that user, and zero, one or more attributes of another user.

20 Claims, 14 Drawing Sheets

(56) References Cited

U.S. PATENT DOCUMENTS

| | | | | |
|---|---|---|---|---|
| 2010/0261521 | A1 | 10/2010 | Oatman et al. | |
| 2011/0003634 | A1 | 1/2011 | Manteris | |
| 2012/0046095 | A1 | 2/2012 | Shore et al. | |
| 2012/0058813 | A1 | 3/2012 | Amaitis et al. | |
| 2012/0214575 | A1 | 8/2012 | Amaitis et al. | |
| 2012/0322540 | A1 | 12/2012 | Shechtman | |
| 2013/0184059 | A1 | 7/2013 | Costello et al. | |
| 2013/0288779 | A1 | 10/2013 | Chun | |
| 2013/0303267 | A1 | 11/2013 | Vasquez et al. | |
| 2014/0256415 | A1 | 9/2014 | Corbo | |
| 2016/0086441 | A1 | 3/2016 | Cohen et al. | |
| 2016/0148463 | A1 | 5/2016 | Gadher et al. | |
| 2016/0189483 | A1* | 6/2016 | Ballman | G06Q 50/34 463/28 |
| 2016/0247359 | A1 | 8/2016 | De Knijff et al. | |
| 2017/0039811 | A1 | 2/2017 | Devaraj et al. | |
| 2018/0268431 | A1 | 9/2018 | Harris | |
| 2018/0322724 | A1 | 11/2018 | Ramos et al. | |
| 2019/0392684 | A1* | 12/2019 | McDonald | G06N 3/08 |
| 2020/0242896 | A1 | 7/2020 | Higgins et al. | |
| 2021/0192884 | A1 | 6/2021 | Idris et al. | |

* cited by examiner

| User ID | Game Bet | Bet Type | Game Date | Game | User's Favorite Team | Favorite Team Bet | Favored or underdog team selected | Bet made through "Follow" | Original Bet Expert who shared the bet |
|---|---|---|---|---|---|---|---|---|---|
| User1 | NY Jets Vs Patriots | Moneyline | 10/10/21 | NFL | Jets | Yes | Favored | Yes | Expert1 |
| User1 | NY Islanders Vs Boston Bruins | Under / Over | 10/12/21 | NHL | Islanders | Yes | Favored | Yes | Expert3 |
| User1 | LA Lakers Vs Chicago Bulls | Point Spread | 06/10/21 | NBA | Bulls | Yes | Favored | No | |
| User1 | LA Clippers Vs Phoenix Suns | Under / Over | 10/13/21 | NBA | LA Clippers | Yes | Underdog | No | |
| User2 | NY Jets Vs Patriots | Moneyline | 10/10/21 | NFL | Jets | Yes | Underdog | Yes | Expert4 |
| User2 | NY Islanders Vs Boston Bruins | Under / Over | 10/12/21 | NHL | Boston Bruins | Yes | Underdog | No | |
| User3 | LA Lakers Vs Chicago Bulls | Point Spread | 06/10/21 | NBA | LA Lakers | No | Favored | Yes | Expert3 |
| User3 | NY Jets Vs Patriots | Moneyline | 10/10/21 | NFL | Patriots | No | | Yes | Expert1 |
| User3 | NY Islanders Vs Boston Bruins | Under / Over | 10/12/21 | NHL | Islanders | No | Underdog | Yes | User1 |

Fig. 2B

| User ID | User's Followed | Game | # of Bets | Wagers |
| --- | --- | --- | --- | --- |
| User1 | Expert1 | NFL | 10 | $300 |
| User1 | Expert3 | NBA | 5 | $200 |
| User2 | Expert4 | NHL | 5 | $100 |
| User3 | User1 | NFL | 10 | $50 |

Fig. 2C

| User ID | Bet Type | Bet Type Rank (last 3 months) | Bet Type Rank (Last 9 months) | Bet Type Rank (Last 3 Years) |
|---|---|---|---|---|
| User1 | Spread | 1 | 1 | 1 |
| User2 | Spread | 1 | 2 | 3 |
| User2 | Moneyline | 2 | 1 | 2 |
| User2 | Moneyline | 3 | 3 | 1 |

Fig. 2D

| User | User / Expert Followed | User/ Expert's Bets followed through (Ratio) | Amount Wagered based on expert's bets | Followed User's/ Expert's success rate (predictions or bets) |
|---|---|---|---|---|
| User1 | Expert1 | 3/10<br>(3 bets made by User1) | $300 | 65% |
| User1 | Expert3 | 5/10 | $200 | 55% |
| User2 | User1 | 1/10 | $50 | 35% |

Fig. 2E

| League ID | Game ID | League Name | Season | Game Date | Time | Home Team | Away Team | Home Team Season Record | Away Team Record | Betting Open? |
|---|---|---|---|---|---|---|---|---|---|---|
| 1 | 10111 | NFL | Regular | Dec 5, 2021 | 1:00 PM Eastern | NJ Jets | NE Patriots | 6-2 | 4-3 | Yes |
| 2 | 50221 | NBA | Regular | Dec 4, 2021 | 5:00PM Eastern | Chicago Bulls | LA Lakers | 33-10 | 33-11 | Yes |
| 3 | 50332 | NBA | Regular | Dec 5, 2021 | 6:00PM Pacific | Phoenix Suns | LA Clippers | 30-12 | 36-10 | Yes |

Fig. 2F

| League ID | Game ID | Favored Team | Underdog | Money Line Favored | Money Line Underdog | Over / Under Score | Spreads (favorite) | Money Line Odds ID | Over/Under ID | Spreads ID |
|---|---|---|---|---|---|---|---|---|---|---|
| 1 | 10111 | NY Jets | NE Patriots | +240 | -140 | 55 | -7 | MLNFL10111 | OUNFL10111 | LSNFL10111 |
| 2 | 50221 | LA Lakers | Chicago Bulls | +220 | -120 | 220 | -4 | MLNBA50221 | OUNBA50221 | LSNBA50221 |
| 3 | 50332 | Phoenix Suns | LA Clippers | +260 | -150 | 210 | -6 | MLNBA50332 | OUNBA50332 | LSNBA50332 |

Fig. 2G

| User | Recommendation Categories | Data Parameters Used | Output Predictions - Probability ( 0 to 1 ) | Output Predictions Weights Boost Applied (Configurable) | Updated Output Predictions Calculation for category | Additional Processing | Recommended Bets and Prediction rating | Display Recommendation Rules |
|---|---|---|---|---|---|---|---|---|
| User1 | Following – Expert1 | <User, expert/ User followed , Key Production Indicators (e.g. bets followed (count), Wagers,# of bets made) > for last n days | 0.7 | 20% | = 0.7 +(0.7* 20/ 100) = **0.84** | Fetch Expert1 current bets for upcoming and boost as below<br>1) If Favorite team's match boost additional 20% (configurable) | Expert1's Current bets<br>NY Jets vs Patriots<br>(Money Line)<br>Favorite team Boost = 20% (eg)<br>Updated Prediction = 0.84 *1.2 = **1.0** | Display recommendations > 0.85 (based on scoring threshold greater than 0.85)<br>Display →<br>NY Jets vs Patriots<br>(Money Line) |
| User1 | Favorite Team (Favored) | <User, Favorite Team Favored, Key Production Indicators (e.g. bets followed (count), Wagers,# of bets made) > for last n days | 0.8 | 30% | = 0.8 +(0.8* 30/ 100)<br>= **1.04** | Get feeds from sports data on Favorite teams (upcoming) | Current sports feeds and schedule show that Chicago Bulls are favored and also happens to be favorite team | Display recommendations > 0.85 (based on scoring threshold greater than 0.85)<br>Display →<br>recommendation Spread (-4 on favorite Chicago Bulls) |
| User1 | Favorite Team (Underdog) | <User, Favorite Team Underdog, Key Production Indicators (e.g. bets followed (count), Wagers,# of bets made) > for last n days | 0.6 | 20% | = 0.7 +(0.7* 20/ 100)<br>= **0.72** | Get feeds from sports data on Favorite teams (upcoming) | Current sports feeds and schedule show that LA Clippers are underdog and also happens to be favorite team | DO NOT display recommendation for this game as the score for this (0.72) is below "configurable" threshold score of 0.85 |

Fig. 2H

| User ID | Sport | Recommended Game | Recommendation Published time (example) | Recommendation Expiry time | Game Time (example) | Type of Bet | Influencer / Expert | # of Bets made by Influencers' / Expert's followers | # of followers | Recommendation Reason |
|---|---|---|---|---|---|---|---|---|---|---|
| User1 | NFL | NY Jets vs NE Patriots | Dec 1, 2021 1:00 PM Eastern | Dec 5, 2021 1:00 PM Eastern | Dec 5, 2021 1:00 PM Eastern | Money Line (-140 on NY Jets | Expert1 | 1200 | 2900 | Higher weighted score for influencer |
| User1 | NHL | Chicago Bulls vs LA Lakers | Dec 2, 2021 1:00 PM Eastern | Dec 4, 2021 5:00PM Eastern | Dec 4, 2021 5:00PM Eastern | Spread (-4 on favorite Chicago Bulls) | | | | Favorite team (Favored in the odds) and by weighted scoring comes higher in the recommendations |

Fig. 2I

SPORTING EVENT WAGERING RECOMMENDATIONS

BACKGROUND

In various embodiments, the systems and methods of the present disclosure pertain to recommending different sporting event wagering opportunities amongst different users.

Sporting event wagering terminals may enable a player to place a sports wager predicting the results of a sporting event.

BRIEF SUMMARY

In certain embodiments, the present disclosure relates to a system including a processor, and a memory device that stores a plurality of instructions. When executed by the processor responsive to an occurrence of a sporting event wager identification event, the instructions cause the processor to determine if any of a plurality of sporting event wagers available to be placed qualify as a recommended sporting event wager, the determination being based on first data associated with a first user and second data associated with a second user, the second user is different from the first user and has a predetermined relationship with the first user. When executed by the processor for each of any of the plurality of sporting event wagers available to be placed determined to qualify as the recommended sporting event wager, the instructions cause the processor to communicate data which results in a display device displaying a notification of the recommended sporting event wager.

In certain embodiments, the present disclosure relates to a system including a processor, and a memory device that stores a plurality of instructions. When executed by the processor for a first sporting event wager available to be placed, the instructions cause the processor to determine, based on first data associated with a first user, second data associated with a second user that is different from the first user, and third data associated with a parameter of the first sporting event wager, if that first sporting event wager qualifies as a first recommended sporting event wager. When executed by the processor responsive to the first sporting event wager qualifying as the first recommended sporting event wager, the instructions cause the processor to communicate data which results in a display device displaying a notification of the first recommended sporting event wager, and enable a placement of the first recommended sporting event wager. When executed by the processor for a second, different sporting event wager available to be placed, the instructions cause the processor to determine, based on first data associated with the first user, fourth data associated with a third user that is different from the first user, and fifth data associated with a parameter of the second, different sporting event wager, if that second, different sporting event wager qualifies as a second recommended sporting event wager. When executed by the processor responsive to the second, different sporting event wager qualifying as the second recommended sporting event wager, the instructions cause the processor to: communicate data which results in the display device displaying a notification of the second recommended sporting event wager, and enable a placement of the second recommended sporting event wager.

In certain embodiments, the present disclosure relates to a method of operating a system. Responsive to an occurrence of a sporting event wager identification event, the method includes determining, by a processor, if any of a plurality of sporting event wagers available to be placed qualify as a recommended sporting event wager, the determination being based on first data associated with a first user and second data associated with a second user, the second user is different from the first user and has a predetermined relationship with the first user. For each of any of the plurality of sporting event wagers available to be placed determined to qualify as the recommended sporting event wager, the method includes displaying, by a display device, a notification of the recommended sporting event wager.

Additional features are described herein, and will be apparent from the following Detailed Description and the figures.

BRIEF DESCRIPTION OF THE SEVERAL VIEWS OF THE DRAWINGS

FIGS. 2B, 2C, 2D, 2E, 2F, 2G, 2H and 2I are example tables showing the various factors associated with a determination of a recommended sporting event wager.

DETAILED DESCRIPTION

Figure 1:
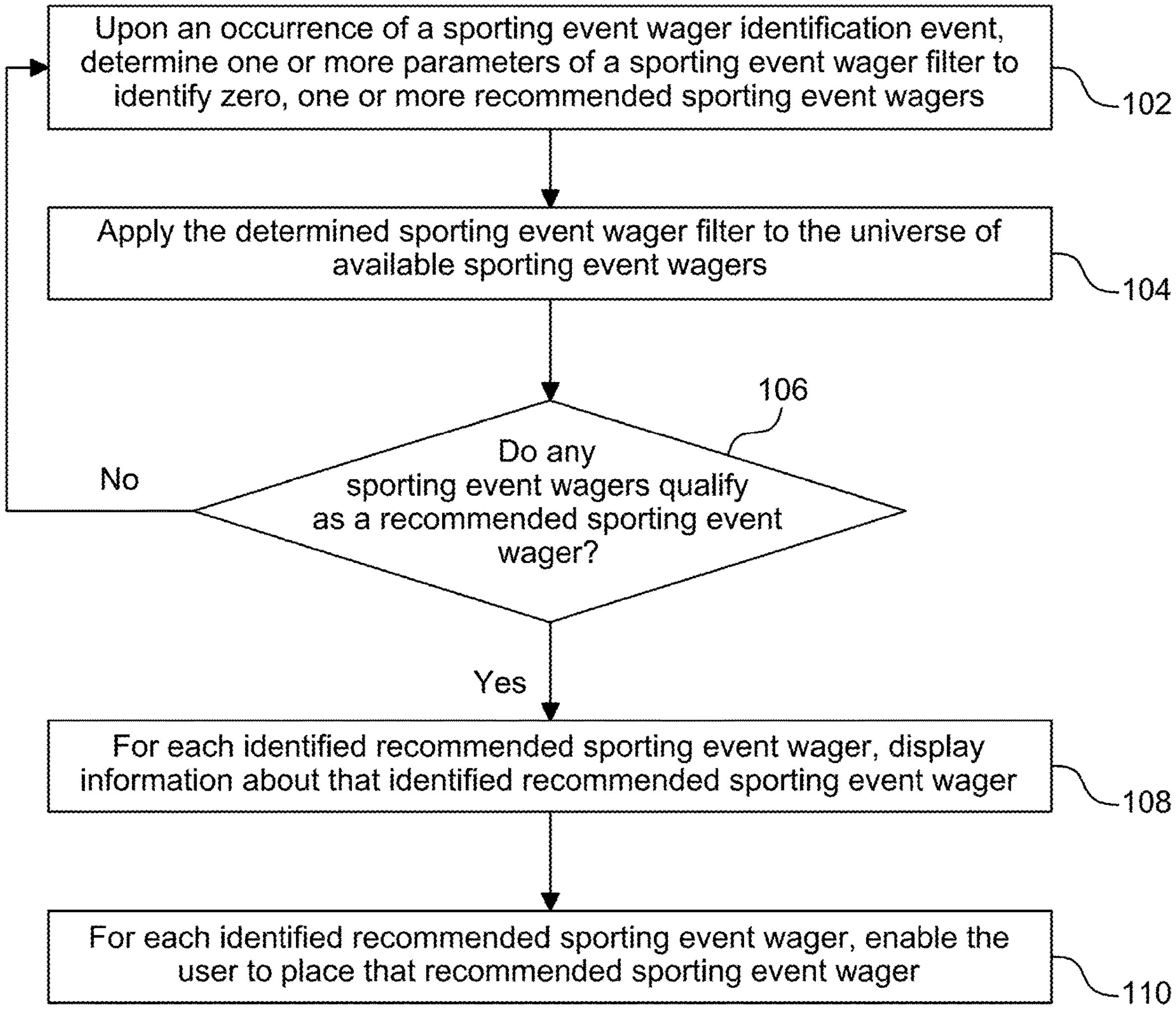
FIG. 1 is a flow chart an example process for operating a system of one embodiment of the present disclosure that enables the system to recommend a sporting event wager based at least in part on various factors associated with a first user and various factors associated with a second user.

In various embodiments, the systems of the present disclosure cause an automatic publication of one or more sporting event wagers to a user based on zero, one or more attributes of that user, and zero, one or more attributes of another user.

In certain embodiments, in view of the different sporting event wagers available to be placed on or otherwise associated with different sporting events and further in view of the degree of relative complication associated with certain of such sporting event wagers, the system enables a first user to track or otherwise follow the sporting event wagering activity associated with a second user. In these embodiments, the system utilizes different information associated with the first user (e.g., personal preferences, sporting event wagering activity, and/or non-sporting event wagering activity associated with the first user), and different information associated with the second user (e.g., the tracked sporting event wagering activity associated with the second user) to recommend zero, one or more sporting event wagers from the universe of available sporting event wagers. For example, the system enables a first sporting event wagerer with limited to no experience placing sporting event wagers an opportunity to receive recommendations based on the sporting event wagering activity of a second, more experienced sporting event wagerer.

In certain embodiments, upon an occurrence of a triggering event, the system screens or otherwise filters the plurality of sporting event wagers available to be placed relative to zero, one or more activities and/or attributes of the first user and/or zero, one or more activities and/or attributes of the tracked second user (or a plurality of tracked second users) to identify zero, one or more sporting event wagers. In these embodiments, rather than attempting to identify zero, one or more sporting event wagers based exclusively on data associated with the first user (e.g., the first user's wagering history and/or preferences) or based exclusively on data associated with a second followed user (e.g., the quantity of other users following the second user and/or recommendations published by the second user), the system utilizes data associated with multiple users and weighs such data to attempt to identify one or more sporting event wagers relatively best suited to recommend to the first user.

If the system fails to identify any sporting event wagers available that correspond to zero, one or more activities and/or attributes of the first user and/or zero, one or more activities and/or attributes of the tracked second user (or the plurality of tracked second users), the system awaits another occurrence of a triggering event. In these embodiments, since the universe of available sporting event wagers is frequently changing as more sporting event wagers become available to be placed and since the system is, in certain embodiments, automatically periodically monitoring the universe of available sporting event wagers for the first user to potentially place, even if the system fails to identify any sporting event wagers to currently recommend, the system continues to attempt to identify one or more sporting event wagers to subsequently recommend to the first user.

On the other hand, if the system identifies one or more sporting event wagers that correspond to zero, one or more activities and/or attributes of the first user and/or zero, one or more activities and/or attributes of the tracked second user (or the plurality of tracked second users), the system proceeds to recommend the identified sporting event wager to the first user. For example, upon the system determining that an available sporting event wager corresponds with one or more attributes of the first, novice sporting event wagerer (e.g., a favorite team of the first sporting event wagerer is associated with the available sporting event wager) and further corresponds with one or more attributes of the more experienced, second sporting event wagerer (e.g., the available sporting event wager is identified as a favorable sporting event wagering opportunity by the second sporting event wagerer), the system determines to recommend the available sporting event wager to the first sporting event wagerer. In certain such embodiments, the system causes the recommendation of the available sporting event wager to be displayed to the first user along with one or more reasons or justifications for the recommendation. In these embodiments, the reasons for the recommendation provided pertain to the first user (e.g., the first user previously won a sporting event wager with the same sporting event participants involved) and/or the second user (e.g., the second user has a success rate above a threshold rate when placing sporting event wagers with similar characteristics). Following the display of any recommended sporting event wagers (and any associated reasoning), the system enables the first sporting event wagerer to act on such recommendation and place the same sporting event wager without having to manually recreate the recommended sporting event wager (which such users may not even know how to do).

It should be appreciated that such a configuration saves certain users time in the form of reducing the quantity of inputs made to place a sporting event wager recommended based on zero, one or more attributes of that user, and zero, one or more attributes of another user. For example, while a four-leg parlay bet typically includes more than eight individual inputs to place (e.g., at least four inputs for each of the four sporting events selected, four inputs for each of the individual legs selected and one input for an amount of the sporting event wager), the same four-leg parlay bet made by a user of the system of the present disclosure takes two individual inputs to place (e.g., one input to select the recommended four-leg parlay bet from the followed user without having to identify the individual legs of the parlay bet, and one input for the amount of the sporting event wager) thereby saving the user time and providing a more streamlined experience interacting with the system. Such a reduction in the amount of inputs required by the user leads to less wear and tear on the machines which receive sporting event wagers and thus prolongs the operational life of such machines.

Moreover, since the placed sporting event wager (that is recommended based on zero, one or more preferences and activities of a first user, and zero, one or more preferences and activities of another user) may be a relatively more complicated bet than the first user is otherwise comfortable making (or even capable of making based on the first user's knowledge of sporting event wagering), such a configuration also reduces user error which may occur when a user incorrectly attempts to make a sporting event wager beyond their skill set. Continuing with the above-example, requiring the first user to make two relatively straightforward inputs (i.e., a selection of the recommended four-leg parlay to wager on and an amount to wager) is associated with a lower probability of error in making such inputs compared to requiring a user to make at least eight relatively complex inputs identifying the different legs of the recommended four-leg parlay. Additionally, by assisting certain novice users in placing certain sporting event wagers, the system of the present disclosure enables such novice users to become more familiar and comfortable with placing sporting event wagers, thereby opening up an additional avenue by which such novice uses can win awards in association with the placement of sporting event wagers.

It should be appreciated that the system of the present disclosure utilized to employ recommended sporting event wagers may be any suitable personal gaming device, such as a mobile device executing an application through which sporting event wagers are placed, any suitable electronic gaming machine ("EGM") (such as a sporting event wagering terminal, a slot machine, a video poker machine, a video lottery terminal, a terminal associated with an electronic table game, a video keno machine, or a video bingo machine) which may or may not also provide one or more wagering games, any suitable slot machine interface board which is in communication with an EGM and operable to employ one or more recommended sporting event wagers, and/or any suitable combination of a sports book wagering server operating with a personal gaming device, an EGM, and/or a slot machine interface board associated with an EGM to offer one or more recommended sporting event wagers.

FIG. 1 is a flowchart of an example process or method of operating the system of the present disclosure. In various embodiments, the process is represented by a set of instructions stored in one or more memories and executed by one or more processors. Although the process is described with reference to the flowchart shown in FIG. 1, many other processes of performing the acts associated with this illustrated process may be employed. For example, the order of certain of the illustrated blocks or diamonds may be changed, certain of the illustrated blocks or diamonds may be optional, or certain of the illustrated blocks or diamonds may not be employed.

In various embodiments, upon an occurrence of a sporting event wager identification event, as indicated in blocks 102 and 104, the system determines one or more parameters of a sporting event wager filter and then applies the determined sporting event wager filter to the universe of available sporting event wagers to identify zero, one or more recommended sporting event wagers. In these embodiments, the system establishes one or more screens to be applied to the universe of available sporting event wagers to narrow such available sporting event wagers to a set of zero, one or more recommended sporting event wagers. That is, the system weights different inputs associated with the user, different inputs associated with other users, and different inputs associated with different available sporting event wagers to determine zero, one or more recommended sporting event wagers.

In certain embodiments, a sporting event wager identification event occurs independent of any user input to identify any sporting event wagers to recommend. In one such embodiment, the system periodically causes a sporting event wager identification event to occur such that the system periodically determines if any available sporting events wagers qualify as a recommended sporting event wager. In this embodiment, rather than the user requesting a recommendation from the system of a sporting event wager to potentially place, the system automatically determines if any sporting event wagers currently in the universe of available sporting event wagers qualify to be recommended to be potentially placed. In different embodiments, the system periodically determines if any available sporting event wagers qualify as a recommended sporting event wager at designated intervals based on time, based on quantities/amounts of sporting event wagers placed, based on the change in the universe of available sporting event wagers, based on another user, such as a followed user, making a sporting event wager, and/or based on any suitable metric.

In certain embodiments, a sporting event wager identification event occurs responsive to a user input. In one such embodiment, if a user wants the system to determine if any available sporting events wagers qualify as a recommended sporting event wager, the user requests the system to cause a sporting event wager identification to occur. In another such embodiment, a sporting event wager identification event occurs responsive to a user input to define one or more sporting event wager filters in the case that no sporting event wager filters are currently associated with the user. In another such embodiment, a sporting event wager identification event occurs responsive to a user input to modify one or more sporting event wager filters in the case that one or more sporting event wager filters is currently associated with the user.

In certain embodiments, a sporting event wager identification event occurs responsive to a user who has not previously configured one or more sporting event wager filters logging into the system. In one such embodiment, after a user who has not previously configured one or more sporting event wager filters (or completed the configuration of such sporting event wager filters) logging into a player tracking system from an EGM, the system offers the user the option of defining one or more sporting event wager filters. In another such embodiment, after a user who has not previously configured one or more sporting event wager filters (or completed the configuration of one or more sporting event wager filters) logging into the system remote from an EGM, such as a user logging into the system using a mobile device application through which sporting event wagers may be placed, the system offers the user the option of configuring one or more sporting event wager filters.

In certain embodiments, the system enables any user the option of configuring one or more sporting event wager filters. In certain embodiments, the system enables designated users the option of configuring one or more sporting event wager filters (and disables such an option for non-designated users). In one such embodiment, the system enables users associated with a player tracking account the option of configuring one or more sporting event wager filters (and disables users not associated with a player tracking account from configuring such sporting event wager filters). In another such embodiment, the system enables users associated with a player tracking account having a player tracking status above a designated level the option of configuring one or more sporting event wager filters (and disables users not associated with a player tracking account or associated with a player tracking account having a player tracking status below the designated level from configuring such sporting event wager filters). In another such embodiment, the system enables users associated with a designated amount of historic wagering activity (e.g., historic wagering game activity and/or historic sporting event wagering activity) the option of configuring one or more sporting event wager filters (and disables users not associated with the designated amount of historic wagering activity from configuring such sporting event wager filters).

In one embodiment, the system enables the user to input one or more parameters of the sporting event wager filter. In one such embodiment, the system enables the user to search for a specific sporting event wager to potentially be recommended. In another such embodiment, the system enables the user to identify a sporting event wager they do not want recommended.

In another embodiment, the system enables the user to input one or more parameters of the sporting event wager filter and the system determines one or more other parameters of the sporting event wager filter. In another embodiment, the system determines one or more parameters of the sporting event wager filter and then enables the user to modify such system determined parameters.

In certain embodiments, the system saves one or more sporting event wager filters in association with a user, such as a user identified via a player tracking system or a user identified via a player tracking system whom has a player tracking status above a designated threshold status. In one such embodiment, the different available parameters are additionally saved by the system which enables a user to configure a specific mix of parameters. In another such embodiment, the different available parameters are additionally saved by the system which enables a user to select different pre-defined combinations of parameters. In another such embodiment, the different available parameters are implemented via a rules engine that enables a user to mix and match various criteria using logical operators (e.g., AND, OR, NOT, greater than or less than).

In certain embodiments, the system charges a fee to a user to configure one or more sporting event wager filters and receive any recommended sporting event wagers. In one such embodiment, the system charges the same fee to each user. In another such embodiment, the system charges different fees for different users, wherein such fees for each user are based on one or more identifying factors (e.g., player tracking status and/or historic wagering activity) of that user. In certain embodiments, the system enables a user to configure one or more sporting event wager filters and receive any recommended sporting event wagers as a courtesy.

In certain embodiments, the system determines one or more parameters of the sporting event wager filter based on one or more attributes associated with the user. In one such embodiment, the system tracks a user's sporting event wagering patterns over time and determines one or more parameters of one or more sporting event wager filters based on the user's history. In these embodiments, the system utilizes any trackable characteristic or activity (i.e., sporting event wagering activity and/or non-sporting event wagering activity) associated with a user to determine which sporting event wagers to recommend for that user to place and which sporting event wagers not to recommend for that user to place. The system of this embodiment dynamically builds one or more sporting event wager filters that match or otherwise correspond to a user's historic sporting event wagers placed by that specific user (or some sub-set of the user's historic sporting event wagers placed). For example, the system analyzes a user's historical sporting event wagers placed to determine one or more parameters of the sporting event wager filter to aid in identifying a sporting event wager to potentially recommend.

In certain embodiments, the system additionally or alternatively determines one or more parameters of the sporting event wager filter based on one or more attributes associated with another user, such as a followed user or a qualifying expert. In these embodiments and as described in more detail below, the system enables a first user to follow one or more other users such that the system determines one or more parameters of the sporting event wager filter based on one or more attributes associated with one or more of such followed users. In one such embodiment, the system tracks a followed user's sporting event wagering patterns over time and determines one or more parameters of one or more sporting event wager filters based on the followed user's history. In these embodiments, the system utilizes any trackable characteristic or activity (i.e., sporting event wagering activity and/or non-sporting event wagering activity) associated with this followed user to determine which sporting event wagers to recommend for another user to place and which sporting event wagers not to recommend for that other user to place. The system of this embodiment dynamically builds one or more sporting event wager filters that match or otherwise correspond to a followed user's historic sporting event wagers placed by the specific followed user, by a group of followed users or by a demographic of followed users. For example, the system analyzes a followed user's historical sporting event wagers placed to determine one or more parameters of the sporting event wager filter to aid in identifying a sporting event wager to potentially recommend.

In certain embodiments, one or more parameters of the sporting event wager filter pertain to the sporting events upon which the user and/or one or more followed users historically places sporting event wagers. For example, the sporting event wager filter enables a user to screen in and/or screen out any sporting event wagers that the user and/or one or more followed users historically place on one type of sport and/or historically does not place on another type of sport. In these embodiments, a parameter of the sporting event wager filter to screen one or more available sporting event wagers include any suitable aspect of a sporting event, including but not limited to, the type of sporting event, the geographic location of the sporting event, the venue of the sporting event, the available outcomes of the sporting event, and/or the available outcomes of one or more activities occurring (or not occurring) within the sporting event (e.g., in-game betting on events which may occur during the course of a sporting event). In this embodiment, any suitable sport or electronic sport which may be bet on is a selectable parameter of a configurable sporting event wager filter.

In another such embodiment, the parameter of the sporting event wager filter includes one or more teams upon which the user and/or one or more followed users historically place sporting event wagers. For example, the sporting event wager filter enables a user to identify any sporting event wagers that the user and/or one or more followed users historically place on the user's favorite college football team. In this embodiment, any suitable team of any suitable organized sport league which may be bet on is a selectable parameter of a configurable sporting event wager filter. In another such embodiment, the parameter of the sporting event wager filter includes one or more participating players upon which the user and/or one or more followed users historically place sporting event wagers. For example, a user may specify that they want the system to identify all sporting event wagers the user and/or one or more followed users historically place in association with a particular athlete. In this embodiment, any suitable player (or players) that are involved in a game or activity which may be bet on is a selectable parameter of a configurable sporting event wager filter. In another such embodiment, the parameter of the sporting event wager filter includes the time of the sporting event that the user and/or one or more followed users historically place sporting event wagers.

In certain embodiments, one or more parameters of the sporting event wager filter pertain to the historical returns realized by the user and/or one or more followed users. In one such embodiment, one or more parameters of the sporting event wager filter pertain to the success rate of one or more sporting event wagers that a followed user historically placed and that a following user subsequently placed following being informed of the followed user's placement. In another such embodiment, the system enables a user to identify sporting event wagers based on the user's performance over a designated period of time and/or one or more followed user's performance over a designated period of time. In these embodiments, the system ranks the different sporting event wagers based on performance and/or any parameter and employs such rankings to identify zero, one or more sporting event wagers to potentially recommend.

In certain embodiments, one or more parameters of the sporting event wager filter pertain to the sporting event wagers the user and/or one or more followed users historically place. In one such embodiment, one or more parameters of the sporting event wager filter pertain to the sporting event wagers a followed user historically placed that a following user subsequently placed following being informed of the followed user's placement. In another such embodiment, a sporting event wager parameter includes the odds of the outcomes of the sporting events on which the user and/or one or more followed users historically place one or more sporting event wagers. In another such embodiment, the sporting event wager parameter includes the odds of the outcomes of one or more activities occurring (or not occurring) within the sporting events on which the user and/or one or more followed users historically place one or more sporting event wagers. In another such embodiment, the sporting event wager parameter includes the payout ranges associated with one or more outcomes of the sporting events on which the user and/or one or more followed users historically place one or more sporting events. In another such embodiment, the sporting event wager parameter includes the payout ranges associated with one or more outcomes of one or more activities occurring (or not occurring) within the sporting events on which the user and/or one or more followed users historically place one or more sporting event wagers. In another such embodiment, the sporting event wager parameter includes the spread associated with the outcomes of the sporting events on which the user and/or one or more followed users historically place one or more sporting event wagers. In another such embodiment, the sporting event wager parameter includes the spreads associated with the outcomes of the activities occurring (or not occurring) within the sporting events on which the user and/or one or more followed users historically place one or more sporting event wagers. As seen by these embodiments, the system enables a user to filter for zero, one or more sporting event wagers that have a specific historical relevance to the user and/or one or more followed users.

In another such embodiment, the sporting event wager parameter include a type of sporting event wager available to be placed that the user and/or one or more followed users historically place one or more sporting event wagers on. In this embodiment, the different types of sporting event wagers available include, but are not limited to, any suitable moneyline wager on an outcome of a sporting event (e.g., Team X will win the game), any suitable wager on an outcome of a sporting event which accounts for a point spread (e.g., Team X will win the game by ten points), any suitable proposition wager on an in-game event occurring or not occurring within the sporting event (e.g., Sporting Event Participant A will make the next free throw), a statistical bet regarding the total statistics associated with a sporting event (e.g., a total yards one team runs for in a football game), a statistical bet regarding the individual statistics associated with a sporting event (e.g., a total number of interceptions one player throws for during a game), a statistical bet regarding the total statistics associated with multiple sporting events (e.g., a total yards one team runs for over the first month of a season), a statistical bet regarding the individual statistics associated with multiple sporting events (e.g., a total number of interceptions one player throws for over an entire season), any suitable handicap wager, any suitable if and reverse wager, any suitable total/over-under wager, any suitable full cover wager, any suitable future/outright wager, any suitable parlay/accumulator multiple sporting event wagers (including but not limited to a progressive parlay wager, a teaser and pleaser wager, a grand salami wager, and/or a round robin wager) and/or any combination of these different available sporting event wagers.

It should be appreciated that the system disclosed herein utilizes any suitable parameter or combination of parameters to screen in and/or screen out zero, one or more available sporting event wagers and identify zero, one or more sporting event wagers which the user may want to potentially place based on one or more attributes of that user, one or more attributes of one or more followed users, and/or one or more attributes of the available sporting event wager. That is, the system utilizes information associated with a first user, information associated with one or more second users that the first user follows, information associated with one or more sporting events, and/or information association with one or more available sporting event wagers to determine which, if any, sporting event wagers to recommend to potentially be placed.

Following the application of the determined sporting event wager filter to the universe of available sporting event wagers, as indicated in diamond 106, the system determines if any sporting event wagers qualify as a recommended sporting event wager. In these embodiments, based on the result of the applied sporting event wager filter, the system determines zero, one or more sporting event wagers which qualify for particular attention by the user based on one or more attributes of the user; one or more attributes of another user whom the user follows; and/or one or more attributes of the sporting event wager. As such, rather than requiring a user to sort through the entire universe of different sporting event wagers which the user may or may not want to place a sporting event wager on, the system automates this process and identifies for the user zero, one or more recommended sporting event wagers which comply with the user's parameters and limits and further comply with one or more followed user's parameters and limits.

In one embodiment, if the system determines that no sporting event wagers qualify as recommended sporting event wagers, the system returns to block 102 and awaits another occurrence of a sporting event wager filtering event. In other words, if no sporting event wagers that satisfy one or more criteria are currently available to be recommended by the system based on one or more attributes of the user; one or more attributes of another user whom the user follows; and/or one or more attributes of the sporting event wager, the system awaits another sporting event wager screening event which may or may not result in the identification of one or more sporting event wagers to recommend to the user to place. In another embodiment, if no sporting event wagers are currently available which qualify as recommended sporting event wagers, the system prompts the user to alter one or more parameters of the applied sporting event wagerer filter.

On the other hand, in certain embodiments, if the system determines that one or more sporting event wagers qualify as recommended sporting event wagers, as indicated in block 108 of FIG. 1, for each identified recommended sporting event wager, the system displays information about that identified recommended sporting event wager. That is, upon the system determining that a sporting event wager currently available to be placed qualifies as a recommended sporting event wager based on one or more attributes of the user; one or more attributes of another user whom the user follows; and/or one or more attributes of the sporting event wager, the system shares information regarding the recommended sporting event wager with the user. For example, after a sports book wagering server receives a sporting event wager from an identified followed user and a component of the system tasked with tracking the sporting event wagering activity of the followed user determines that, based on one or more attributes of the following user, such a sporting event wager placed qualifies as a recommended sporting event wager, that component of the system (or another component of the system tasked with notifying any following users of sporting event wagers placed) causes one or more display devices to display information associated with the available sporting event wager as a recommended sporting event wager. In certain embodiments, the information associated with the recommended sporting event wager includes, but is not limited to, any historic sporting event wagering activity of the user or the followed user that pertains to the recommended sporting event wager, any sporting event wagering preferences of the user or the followed user that pertains to the recommended sporting event wager, the type of sporting event wager, the specific details of the sporting event wager (e.g., details on the individual legs of a parlay bet), and/or the odds associated with the sporting event wager.

Figure 2A:
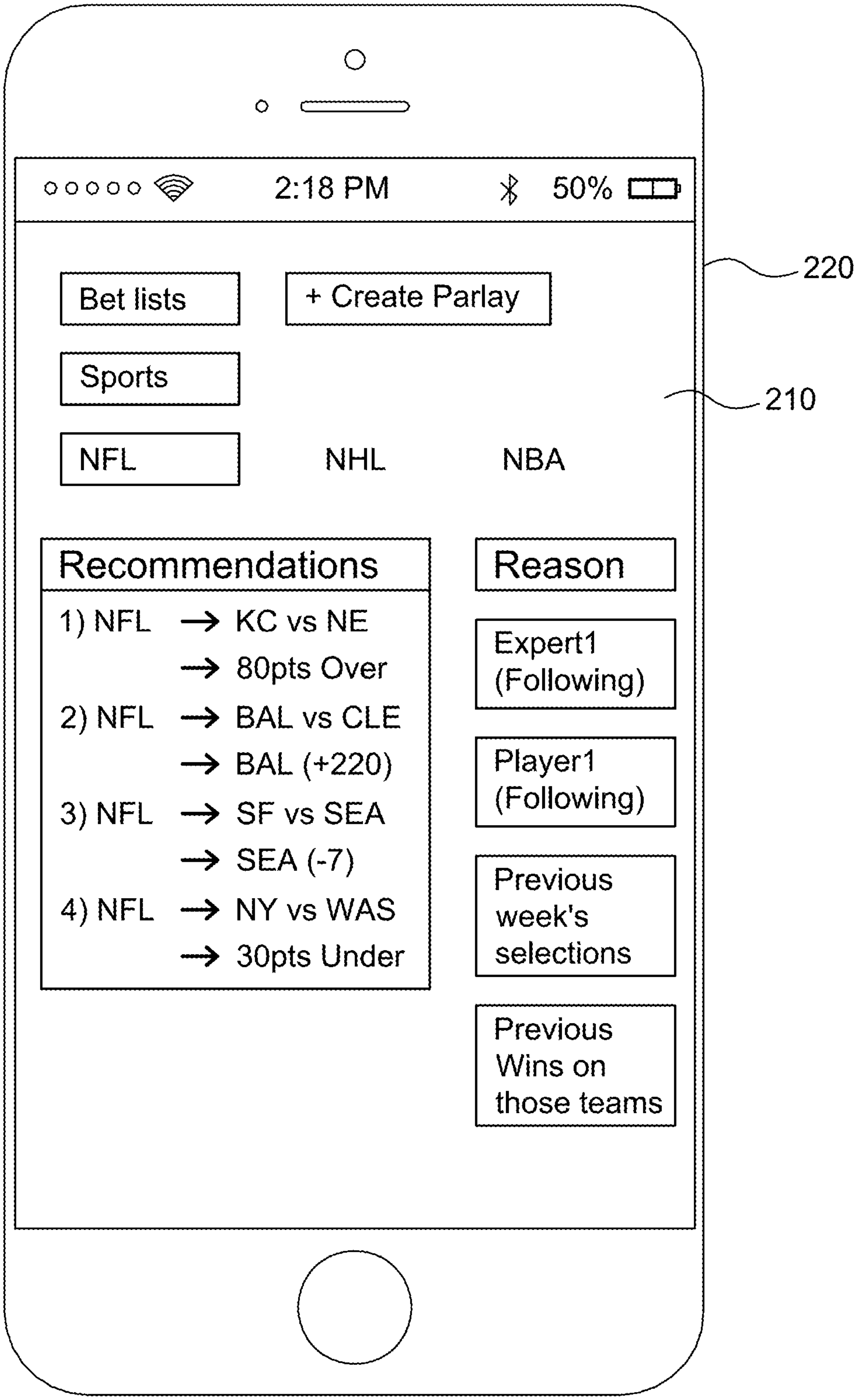
FIG. 2A is a front view of one embodiment of the system of the present disclosure illustrating a mobile device displaying a recommended sporting event wager and the reasoning such a sporting event wager was recommended.

In certain embodiments, if the system determines that one or more sporting event wagers qualify as recommended sporting event wager, for each identified designated sporting event wager, the system displays the recommended sporting event wager as well as a reason for making such a recommendation. For example, as seen in FIG. 2A, following the determination of one or more recommended sporting event wagers, the system causes a mobile device application 210 of a mobile device 220 to display a message to a first user associated with the mobile device of the availability to place such recommended sporting event wagers as well as the reasons (e.g., the recommended sporting event wager was identified by one or more other users whom the first user follows, the first user previously placed similar sporting event wagers and/or the first user previously won sporting event wagers involving the same teams) justifying the recommendations. In different embodiments, the system displays information associated with any recommended sporting event wager and/or any reasoning in recommending such a sporting event wager in any suitable manner, such as through a notification of a mobile device application associated with the placement of sporting event wagers, social media postings, social media feeds, website postings, website feeds, e-mail, mailings, SMS or text messages, content displayed in one or more service windows of an EGM, content displayed via a display device controlled by a slot machine interface board, or any other suitable medium.

In certain embodiments wherein a recommended sporting event wager is at least partially based on the activities of a followed user, the recommended sporting event wager includes the same sporting event wager that a followed user placed (or otherwise identified). In these embodiments, the system enables a following user to place the same bet as that placed (or otherwise identified) by the followed user. In certain embodiments wherein a recommended sporting event wager is at least partially based on the activities of a followed user, the recommended sporting event wager includes a sporting event wager based on, but different from, the sporting event wager that the followed user placed (or otherwise identified). In these embodiments, the system enables a following user to place a slightly different bet than the bet placed (or otherwise identified) by the followed user. In different embodiments, the difference between the sporting event wagers pertains to the odds associated with such sporting event wagers, and/or the payouts associated with such sporting event wagers.

In different embodiments, the recommended sporting event wager includes any suitable sporting event wager associated with one or more of any suitable sporting events and/or electronic sporting events at any professional and/or amateur level including but not limited to, football, basketball, baseball, boxing, horse racing, wrestling, mixed martial arts, golf, cricket, soccer, hockey, field hockey, tennis, volleyball, table tennis, ruby, swimming, diving, archery, cycling, billiards, fishing, gymnastics, hunting, track and field, sailing, and/or car racing. In different embodiments, the recommended sporting event wager includes any suitable type sporting event wager including, but not limited to, any suitable moneyline wager on an outcome of a sporting event (e.g., Team X will win the game), any suitable wager on an outcome of a sporting event which accounts for a point spread (e.g., Team X will win the game by ten points), any suitable proposition wager on an in-game event occurring or not occurring within the sporting event (e.g., Sporting Event Participant A will make the next free throw), a statistical bet regarding the total statistics associated with a sporting event (e.g., a total yards one team runs for in a football game), a statistical bet regarding the individual statistics associated with a sporting event (e.g., a total number of interceptions one player throws for during a game), a statistical bet regarding the total statistics associated with multiple sporting events (e.g., a total yards one team runs for over the first month of a season), a statistical bet regarding the individual statistics associated with multiple sporting events (e.g., a total number of interceptions one player throws for over an entire season), any suitable handicap wager, any suitable if and reverse wager, any suitable total/over-under wager, any suitable full cover wager, any suitable future/outright wager, any suitable parlay/accumulator multiple sporting event wagers (including but not limited to a progressive parlay wager, a teaser and pleaser wager, a grand salami wager, and/or a round robin wager) and/or any combination of these different available sporting event wagers.

In certain embodiments, the recommended sporting event wager includes any suitable sporting event wager associated with any live sporting events, such as sporting events currently being played. In certain embodiments, the recommended sporting event wager includes any suitable sporting event wager associated with any future sporting events, such as sporting events that will soon be played. In these embodiments, the system displays to the following users any identifying information regarding the sporting event, such as identifying the participants in the sporting event, information about the participants historical performance in similar sporting events, and the odds of one or more sporting event wagers available in association with such sporting events. It should be appreciated that if the system subsequently or concurrently displays one or more sporting events associated with one or more recommended sporting event wagers, in different embodiments, the system may display a live broadcast of the sporting event or an animated or textual representation of the sporting event, and the sporting event may or may not be displayed in its entirety or portions of the sporting event may or may not be displayed periodically, such as in the form of replays or highlight reels.

In certain embodiments, the recommended sporting event wager includes any suitable sporting event wager associated with any historical sporting events, such as a prerecorded sporting event. In these embodiments, to prevent users from determining an outcome of the historic sporting event prior to placing any sporting event wagers on such historic sporting events, the system masks certain of the identifying information associated with that sporting event. That is, the system anonymizes identifying information about teams, historical team records, sporting event players, and/or historical sporting event player statistics each time that information is presented to users. In certain embodiments, the recommended sporting event wager includes any suitable sporting event wager associated with a recreation of a prior sporting event, and/or a simulated sporting event (e.g., a sporting event created from different parts of different historical sporting events wherein zero, one or more results of such a simulated sporting event are randomly determined).

In certain embodiments, the recommended sporting event wager includes any suitable sporting event wager associated with virtual or electronic sport ("eSport") events. In different embodiments, such virtual or eSports events are played by humans, by computer driven participants or by a mix of human and computer driven participants.

It should thus be appreciated that the present disclosure weighs one or more inputs associated with an individual user, one or more inputs associated with one or more followed users, one or more inputs associated with one or more sporting events, and one or more inputs associated with one or more sporting event wagers available to determine a recommended sporting event wager for that individual user. In such embodiments, the system weights the different inputs associated with these different data points and determines a score or ranking of different available sporting event wagers. Following such a score or ranking determination, the system determines whether or not to recommend that sporting event wager based on the score or ranking assigned to an available sporting event wager relative to a threshold qualifying score or ranking. For example, as seen in FIGS. 2B, 2C and 2D, for each of a plurality of individual users, the system analyses various data associated with such users (e.g., favorite teams, favorite bets, experts or other users followed), and such user's historic wagering activity (e.g., number of bets, types of bets, wager amounts placed) as part of the sporting event wager recommendation determination. In this example, as seen in FIG. 2E, for each individual user, the system also analyses various data associated with the other users or experts followed (e.g., amounts wagered on expert's bets, success rate on expert's bets) as part of the sporting event wager recommendation determination. In this example, in addition to factoring in data associated with such individual users and such followed users or experts, as seen in FIGS. 2F and 2G, the system also analyses various data associated with the sporting events scheduled to occur (e.g., each team's respective record) and various data associated with the sporting event wagers available (e.g., money line, spreads, over/under) as part of the sporting event wager recommendation determination. With such different data associated with such different data sources, the system determines a score or ranking of different available sporting event wagers and then utilizes the determined score or ranking (relative to a threshold score or ranking) to recommend zero, one or more sporting event wagers (see FIG. 2H) as well as zero, one or more reasons for such recommended sporting event wagers (see FIG. 2I).

In certain embodiments, in addition to recommending a sporting event wager, for each identified recommended sporting event wager, the system enables the user to place that recommended sporting event wager as indicated in block 110 of FIG. 1. In one such embodiment, the system enables the user to place the recommended sporting event wager without having to manually recreate the recommended sporting event wager (which such users may not even know how to do). That is, in certain embodiments, the system enables the user to make one or more inputs to place a recommended sporting event wager wherein the quantity of inputs made to place the recommended sporting event wager is less than the number of inputs required to place the same sporting event wager if that sporting event wager was not recommended. For example, the system enables a user to make one or more inputs to cause a multiple-legged parlay bet to be placed (subject to the user having adequate funds to place the bet and a sporting event wagering system approving and processing the placement of the bet) that would otherwise require a greater quantity of inputs to place. It should be appreciated that such a configuration saves certain users time in the form of reducing the quantity of inputs made to place a sporting event wager. Such a reduction in the amount of inputs required of the user leads to less wear and tear on the machines which receive sporting event wagers and thus prolongs the operational life of such machines. Moreover, since the placed sporting event wager may be a relatively more complicated bet than the user is otherwise comfortable making (or even capable of making based on the user's knowledge of sporting event wagering), such a configuration also reduces user error which may occur when a user incorrectly attempts to make a sporting event wager beyond their skill set. In certain embodiments, the system automatically places a recommended sporting event wager. In certain such embodiments, subject to one or more preset amounts and/or odds determined by a user, the system automatically places the recommended sporting event wager.

In certain embodiments, in association with the placement of a sporting event wager, the system communicates data associated with the sporting event wager to a sports book wagering server. For example, after a user decides to place a recommended sporting event wager, the mobile device (or a server in communication with the mobile device) communicates data associated with the sporting event wager to a sports book wagering server. In certain embodiments wherein the user is not employing a mobile device to place such sporting event wagers, an EGM and/or a component of a gaming establishment management system, such as a slot machine interface board associated with the EGM (i.e., a component of the EGM)) communicates data associated with the sporting event wager to a sports book wagering server.

In certain embodiments, following the sports book wagering server receiving the data associated with the sporting event wager, the sports book wagering server determines whether to accept or reject the sporting event wager. If the sports book wagering server rejects the attempted sporting event wager, the sports book wagering server communicates a denial notification to the system to display to the user. On the other hand, if the sports book wagering server accepts the sporting event wager, the sports book wagering server associates a sporting event wager identifier with the sporting event wager and stores the sporting event wager identifier.

In various embodiments, following the user placing the sporting event wager, the system issues a sporting event wager ticket voucher (which may be in printed or virtual form) associated with the placed sporting event wager. In these embodiments, the sporting event wager ticket voucher denotes information associated with the placed sporting event wager (e.g., date/time of sporting event, and the wagered on outcome of sporting event), wherein such information associated with the sporting event wager ticket voucher is stored in one or more sporting event wager ticket voucher databases to reflect the placement of the sporting event wager. In different embodiments, the sporting event wager ticket voucher database and/or the sporting event wager ticket voucher includes or is otherwise associated with various fields of sporting event wager ticket voucher identifying information including, but not limited to: a primary key (i.e., an index for a record in a table); a sporting event wager ticket voucher validation number (i.e., the validation number associated with the issued ticket voucher); a ticket voucher state (e.g., a state of a ticket voucher as being in an issued state or a redeemed state); an issuance date/time (i.e., the date/time when the sporting event wager ticket voucher was issued); a property address associated with the sporting event wager ticket voucher issuance; an amount of funds associated with the sporting event wager ticket voucher; the placed sporting event wager associated with the sporting event wager ticket voucher; any expiration date associated with the sporting event wager ticket voucher; a device identification associated with the issuance of the sporting event wager ticket voucher; an image of the sporting event wager ticket voucher (e.g., an image of a front of the sporting event wager ticket voucher and/or an image of a back of the sporting event wager ticket voucher); any redemption date (i.e., the date the sporting event wager ticket voucher was redeemed at (if the sporting event wager ticket voucher is in the redeemed state after the placed sporting event wager is determined to be a winning sporting event wager)); redeemed at (i.e., the device where the sporting event wager ticket voucher was redeemed (if the sporting event wager ticket voucher is in the redeemed state)); a data signature (i.e., a signature of the data associated with the sporting event wager ticket voucher to prevent tampering by casino employees); and/or a machine identification (i.e., an asset or machine number of the device that printed the sporting event wager ticket voucher).

In various embodiments, as indicated above, the system factors in one or more attributes of one or more third-party sporting event wagerers in determining zero, one or more sporting event wagers to recommend to a user. In these embodiments, to determine which third-party sporting event wagerers to potentially factor into such a recommendation (and which third-party sporting event wagerers to ignore from any such recommendation) the system first needs to identify such sporting event wagerers. In certain embodiments, upon an occurrence of a sporting event wagerer identification event, the system determines one or more parameters of a sporting event wagerer filter to identify zero, one or more followable sporting event wagerers. In these embodiments, the system enables a first user to establish one or more screens to be applied to the universe of available second users that place sporting event wagers to narrow such available second users to the ones which the first user may potentially want to follow.

In one embodiment, the system enables the user to input one or more parameters of the sporting event wagerer filter. In one such embodiment, the system enables the user to search for a specific sporting event wagerer, such as perform a name search of a friend or family member sporting event wagerer that the user may potentially want to follow. In another such embodiment, the system enables the user to identify a sporting event wagerer whom they do not want to follow or want to unfollow.

In another embodiment, the system determines one or more parameters of the sporting event wagerer filter. In one such embodiment, the system tracks a user's sporting event wagering patterns over time and determines one or more parameters of one or more sporting event wagerer filters based on the user's history. The system of this embodiment dynamically builds one or more sporting event wagerer filters that match or otherwise correspond to a user's historic sporting event wagers placed by the specific user, by a group of users or by a demographic of users that includes the specific user (or some sub-set of the user's historic sporting event wagers placed). For example, the system analyzes a user's historical sporting event wagers placed to determine one or more parameters of the sporting event wagerer filter to identify a sporting event wagerer with similar betting patterns that the user may want to follow.

In another embodiment, the system enables the user to input one or more parameters of the sporting event wagerer filter and the system determines one or more other parameters of the sporting event wagerer filter. For example, the system enables the user to search for a specific sporting event wagerer, such as perform a name search of a friend or family member sporting event wagerer that the user may potentially want to follow and then the system applies a filter based on the wagering patterns and/or historical performance of such friends and family members to identify zero, one or more specific sporting event wagerers to follow. In another embodiment, the system determines one or more parameters of the sporting event wagerer filter and then enables the user to modify such system determined parameters.

In certain embodiments, one or more parameters of the sporting event wagerer filter pertain to the sporting events upon which the sporting event wagerer historically places sporting event wagers. For example, the sporting event wagerer filter enables a user to screen in and/or screen out any sporting event wagerers that historically place sporting event wagers on one type of sport and/or historically do not place sporting event wagers on another type of sport. In these embodiments, a sporting event parameter to screen one or more available sporting event wagerers include any suitable aspect of a sporting event, including but not limited to, the type of sporting event, the geographic location of the sporting event, the venue of the sporting event, the available outcomes of the sporting event, and/or the available outcomes of one or more activities occurring (or not occurring) within the sporting event (e.g., in-game betting on events which may occur during the course of a sporting event). In this embodiment, any suitable sport or electronic sport which may be bet on is a selectable parameter of a configurable sporting event wagerer filter.

In another such embodiment, the sporting event parameter includes one or more teams upon which the sporting event wagerer historically places sporting event wagers. For example, the sporting event wagerer filter enables a user to identify any sporting event wagerers that historically place sporting event wagers on the user's favorite college football team. In this embodiment, any suitable team of any suitable organized sport league which may be bet on is a selectable parameter of a configurable sporting event wagerer filter. In another such embodiment, the sporting event parameter includes one or more participating players upon which the sporting event wagerer historically places sporting event wagers. For example, a user may specify that they want the system to identify all sporting event wagerers that historically place sporting event wagers in association with a particular athlete. In this embodiment, any suitable player (or players) that are involved in a game or activity which may be bet on is a selectable parameter of a configurable sporting event wagerer filter. In another such embodiment, the sporting event parameter includes the time of the sporting event that the sporting event wagerer historically places sporting event wagers.

In certain embodiments, one or more parameters of the sporting event wagerer filter pertain to the historical returns realized by a sporting event wagerer. In one such embodiment, the system enables a user to identify sporting event wagerers based on their performance over a designated period of time. For example, the system ranks, based on winning percentage of bets placed, the universe of sporting event wagerers over the past month and employs the sporting event wagerer filter to identify the top ten sporting event wagerers over the past month. In these embodiments, the system ranks the different sporting event wagerers based on performance and/or any parameter of the sporting event wagerer and employs such rankings to identify zero, one or more sporting event wagerers. For example, the system ranks, based on total winnings, the universe of sporting event wagerers whom has placed sporting event wagers on professional football games during the current season and employs the sporting event wagerer filter to identify the top twenty-five professional football sporting event wagerers during the current season.

In certain embodiments, one or more parameters of the sporting event wagerer filter pertain to the sporting event wagers the sporting event wagerer historically places. In one such embodiment, a sporting event wagerer parameter includes the odds of the outcomes of the sporting events on which a sporting event wagerer historically places. In another such embodiment, the sporting event wagerer parameter includes the odds of the outcomes of one or more activities occurring (or not occurring) within the sporting events on which a sporting event wagerer historically places. In another such embodiment, the sporting event wagerer parameter includes the payout ranges associated with one or more outcomes of the sporting events on which a sporting event wagerer historically places. In another such embodiment, the sporting event wagerer parameter includes the payout ranges associated with one or more outcomes of one or more activities occurring (or not occurring) within the sporting events on which a sporting event wagerer historically places. In another such embodiment, the sporting event wagerer parameter includes the spread associated with the outcomes of the sporting events on which a sporting event wagerer historically places. In another such embodiment, the sporting event wagerer parameter includes the spreads associated with the outcomes of the activities occurring (or not occurring) within the sporting events on which a sporting event wagerer historically places. As seen by these embodiments, the system enables a user to filter for zero, one or more sporting event wagerers that have a specific historical style of wagering on sporting events. Such a configuration enables a user to identify zero, one or more sporting event wagerers based on their risk/reward profile.

In another such embodiment, the sporting event wagerer parameter include a type of sporting event wager available to be placed that a sporting event wagerer historically places. It should be appreciated that the system disclosed herein utilizes any suitable parameter or combination of parameters to screen in and/or screen out zero, one or more available sporting event wagerers and identify zero, one or more sporting event wagerers which the user may want to follow or at least be aware of the possibility to follow. That is, the system utilizes one or more parameters associated with a sporting event wagerer, a sporting event and/or the bets available to be placed in association with that sporting event to determine which, if any, sporting event wagerers a user may want to follow. It should be further appreciated that in certain embodiments, the system enables a sporting event wagerer to opt-into (or alternatively opt out from) being followed by zero, one or more other users and/or having their sporting event wagers shared (or a portion of their sporting event wagers shared).

Following the configuration of one or more sporting event wagerer filters via the determination of one or more parameters, the system applies the determined sporting event wagerer filter to the universe of available sporting event wagerers and determines if any sporting event wagerers qualify as designated sporting event wagerers for that user to follow. That is, based on the result of the applied sporting event wagerer filter, the system determines zero, one or more sporting event wagerers which qualify for particular attention by the user. As such, rather than requiring a user to sort through the entire universe of different sporting event wagerers which the user may or may not want to follow, the system automates this process and identifies for the user zero, one or more sporting event wagerers which comply with the user's preconfigured parameters and limits.

In one embodiment, if the system determines that no sporting event wagerers qualify as designated sporting event wagerers for that user to follow, the system awaits another occurrence of a sporting event wagerer filtering event. In other words, if no sporting event wagerers that satisfy one or more criteria are currently available for the user to follow, the system awaits another sporting event wagerer screening event which may or may not result in the identification of one or more sporting event wagerers for the user to follow. In another embodiment, if no sporting event wagerers are currently available which qualify as designated sporting event wagerers for the user to follow, the system prompts the user to alter one or more parameters of the sporting event wagerer filter.

On the other hand, in certain embodiments, if the system determines that one or more sporting event wagerers qualify as designated sporting event wagerers to follow, for each identified designated sporting event wagerer, the system displays information about that identified designated sporting event wagerer. In different embodiments, the system displays such information in any suitable manner, such as through a notification of a mobile device application associated with the placement of sporting event wagers, social media postings, social media feeds, website postings, website feeds, e-mail, mailings, SMS or text messages, content displayed in one or more service windows of an EGM, content displayed via a display device controlled by a slot machine interface board, or any other suitable medium.

In certain embodiments, if the system determines that one or more sporting event wagerers qualify as designated sporting event wagerers to follow, for each identified designated sporting event wagerer, the system enables the user to enroll to follow that designated sporting event wagerer.

In certain embodiments, if the system determines that one or more sporting event wagerers qualify as designated sporting event wagerers to follow, for each identified designated sporting event wagerer, the system automatically signs the user up to follow that designated sporting event wagerer. This automatic following of a sporting event wagerer directly benefits users in that the user will save time in not sorting through the universe of sporting event wagerers available to follow and further in that the user will not miss out on the opportunity to follow one or more sporting event wagerers.

In certain embodiments, the system enables any user to follow one or more sporting event wagerers. In certain embodiments, the system enables designated users to follow one or more sporting event wagerers (and disables such an option for non-designated users). In one such embodiment, the system enables users associated with a player tracking account to follow one or more sporting event wagerers (and disables users not associated with a player tracking account). In another such embodiment, the system enables users associated with a player tracking account having a player tracking status above a designated level to follow one or more sporting event wagerers (and disables users not associated with a player tracking account or associated with a player tracking account having a player tracking status below the designated level from following one or more sporting event wagerers). In another such embodiment, the system enables users associated with a designated amount of historic wagering activity (e.g., historic wagering game activity and/or historic sporting event wagering activity) to follow one or more sporting event wagerers (and disables users not associated with the designated amount of historic wagering activity from such following).

The above-described embodiments may be implemented in accordance with or in conjunction with one or more of a variety of different types of systems, such as, but not limited to, those described below.

The present disclosure contemplates a variety of different systems each having one or more of a plurality of different features, attributes, or characteristics. A "system" or "gaming system" as used herein refers to various configurations of: (a) one or more servers; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices.

Thus, in various embodiments, the system of the present disclosure includes: (a) one or more electronic gaming machines in combination with one or more servers; (b) one or more personal gaming devices in combination with one or more servers; (c) one or more personal gaming devices in combination with one or more electronic gaming machines; (d) one or more personal gaming devices, one or more electronic gaming machines, and one or more servers in combination with one another; (e) a single electronic gaming machine; (f) a plurality of electronic gaming machines in combination with one another; (g) a single personal gaming device; (h) a plurality of personal gaming devices in combination with one another; (i) a single server; and/or (j) a plurality of servers in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "server" as used herein represents one server or a plurality of servers.

As noted above, in various embodiments, the system includes an EGM (or personal gaming device) in combination with a server. In such embodiments, the EGM (or personal gaming device) is configured to communicate with the server through a data network or remote communication link. In certain such embodiments, the EGM (or personal gaming device) is configured to communicate with another EGM (or personal gaming device) through the same data network or remote communication link or through a different data network or remote communication link. For example, the system includes a plurality of EGMs that are each configured to communicate with a server through a data network.

In certain embodiments in which the system includes an EGM (or personal gaming device) in combination with a server, the server is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the server. The at least one processor of that EGM (or personal gaming device) is configured to execute the events, messages, or commands represented by such data or signals in conjunction with the operation of the EGM (or personal gaming device). Moreover, the at least one processor of the server is configured to transmit and receive data or signals representing events, messages, commands, or any other suitable information between the server and the EGM (or personal gaming device). The at least one processor of the server is configured to execute the events, messages, or commands represented by such data or signals in conjunction with the operation of the server. One, more than one, or each of the functions of the server may be performed by the at least one processor of the EGM (or personal gaming device). Further, one, more than one, or each of the functions of the at least one processor of the EGM (or personal gaming device) may be performed by the at least one processor of the server.

In certain such embodiments, computerized instructions for controlling any games (such as any primary or base games and/or any secondary or bonus games) displayed by the EGM (or personal gaming device) are executed by the server. In such "thin client" embodiments, the server remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the server to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the system includes an EGM (or personal gaming device) and a server, computerized instructions for controlling any primary or base games displayed by the EGM (or personal gaming device) are communicated from the server to the EGM (or personal gaming device) in a thick client configuration, and computerized instructions for controlling any secondary or bonus games or other functions displayed by the EGM (or personal gaming device) are executed by the server in a thin client configuration.

In certain embodiments in which the system includes: (a) an EGM (or personal gaming device) configured to communicate with a server through a data network; and/or (b) a plurality of EGMs (or personal gaming devices) configured to communicate with one another through a data network, the data network is a local area network (LAN) in which the EGMs (or personal gaming devices) are located substantially proximate to one another and/or the server. In one example, the EGMs (or personal gaming devices) and the server are located in a gaming establishment or a portion of a gaming establishment.

In other embodiments in which the system includes: (a) an EGM (or personal gaming device) configured to communicate with a server through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the server. For example, one or more of the EGMs (or personal gaming devices) are located: (a) in an area of a gaming establishment different from an area of the gaming establishment in which the server is located; or (b) in a gaming establishment different from the gaming establishment in which the server is located. In another example, the server is not located within a gaming establishment in which the EGMs (or personal gaming devices) are located. In certain embodiments in which the data network is a WAN, the system includes a server and an EGM (or personal gaming device) each located in a different gaming establishment in a same geographic area, such as a same city or a same state. Systems in which the data network is a WAN are substantially identical to systems in which the data network is a LAN, though the quantity of EGMs (or personal gaming devices) in such systems may vary relative to one another.

In further embodiments in which the system includes: (a) an EGM (or personal gaming device) configured to communicate with a server through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the server identifies a player before enabling that player to place any wagers on any plays of any wagering games. In one example, the server identifies the player by requiring a player account of the player to be logged into via an input of a unique username and password combination assigned to the player. The server may, however, identify the player in any other suitable manner, such as by validating a player tracking identification number associated with the player; by reading a player tracking card or other smart card inserted into a card reader (as described below); by validating a unique player identification number associated with the player by the server; or by identifying the EGM (or personal gaming device), such as by identifying the MAC address or the IP address of the Internet facilitator. In various embodiments, once the server identifies the player, the server enables placement of one or more wagers on one or more plays of one or more primary or base games and/or one or more secondary or bonus games, and displays those plays via the Internet browser of the EGM (or personal gaming device).

The server and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 3:
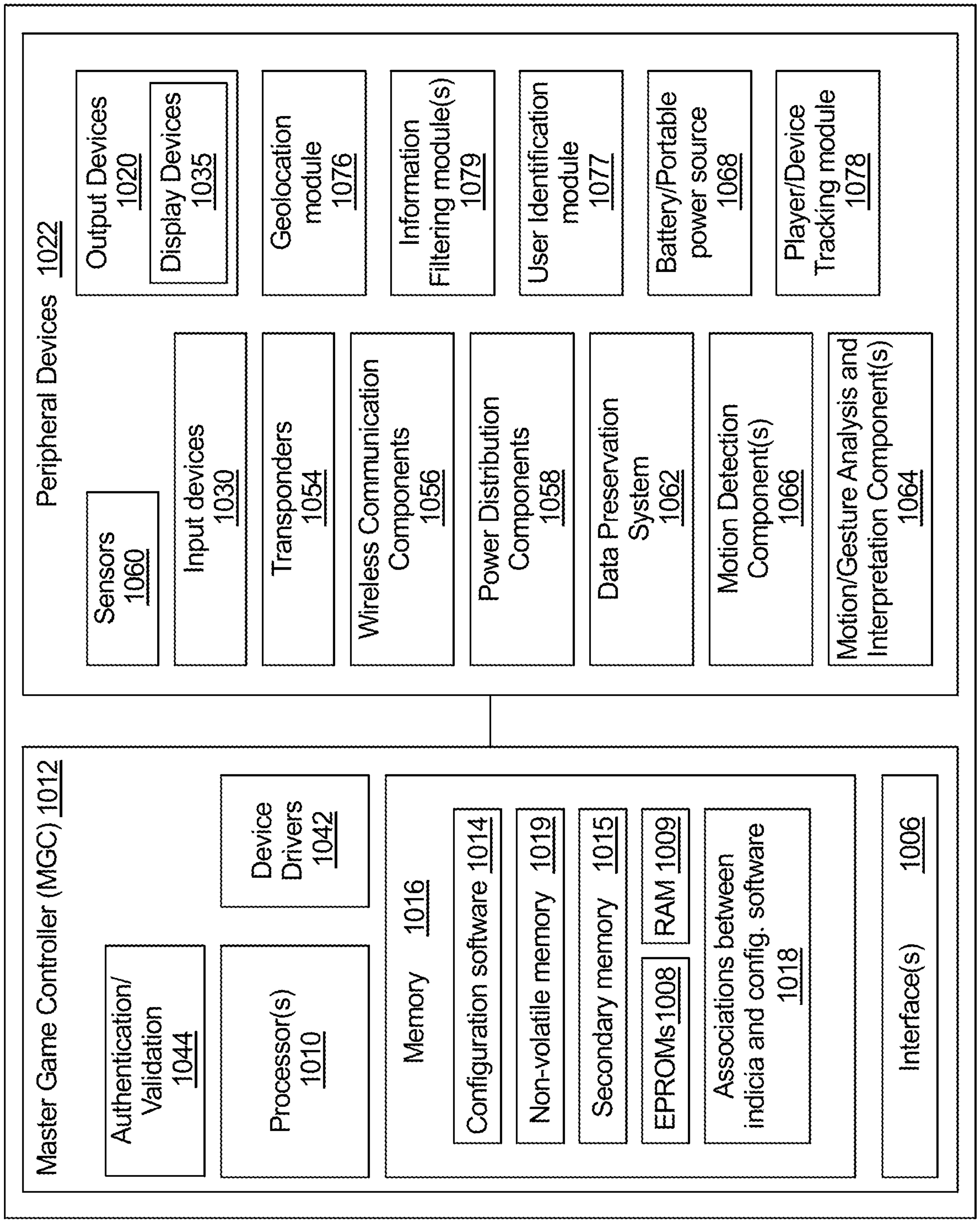
FIG. 3 is a schematic block diagram of one embodiment of an electronic configuration of an example system of the present disclosure.
Figure 4A:
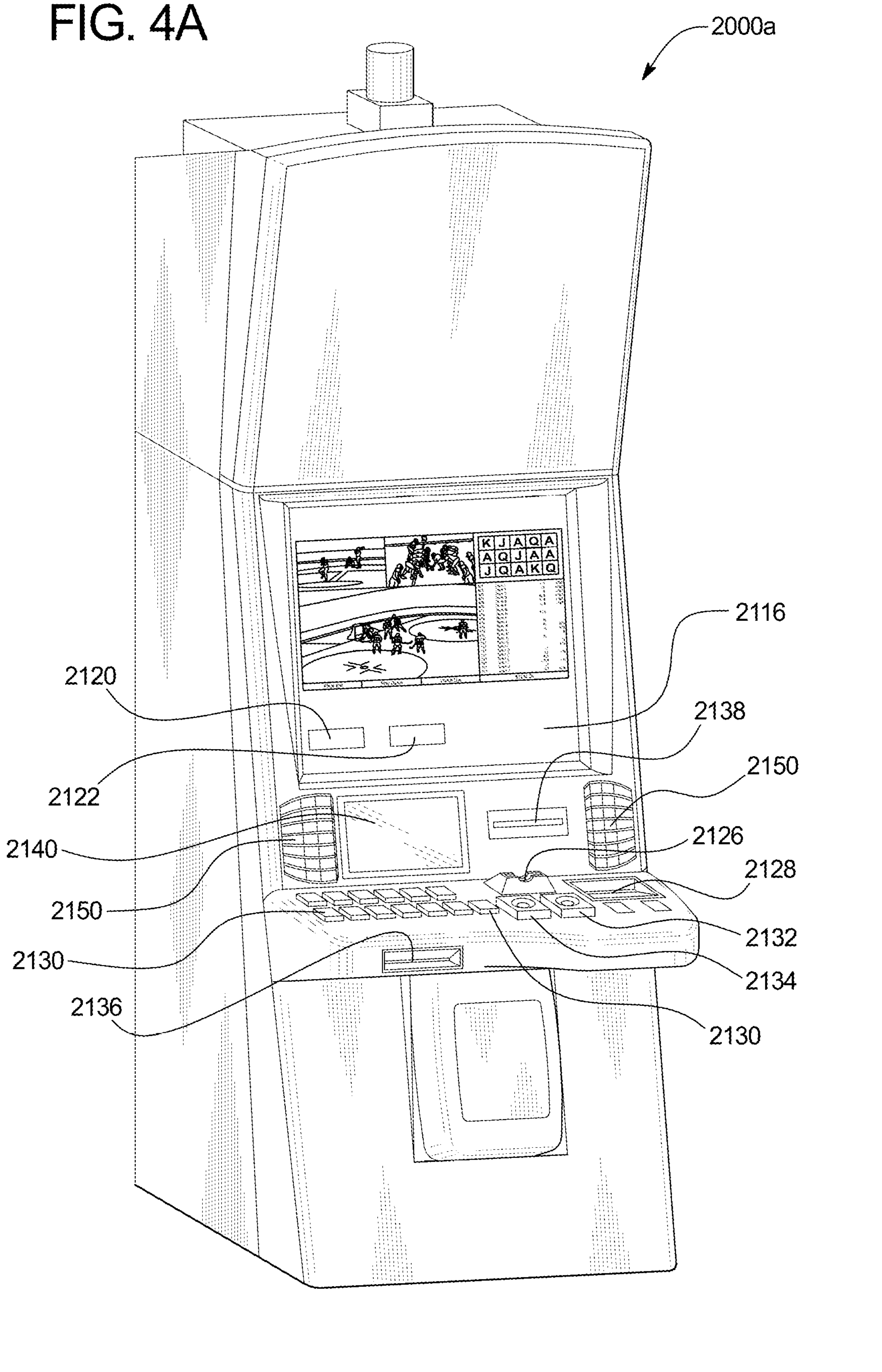
FIGS. 4A and 4B are perspective views of example alternative embodiments of an electronic gaming machine of the present disclosure.
Figure 4B:
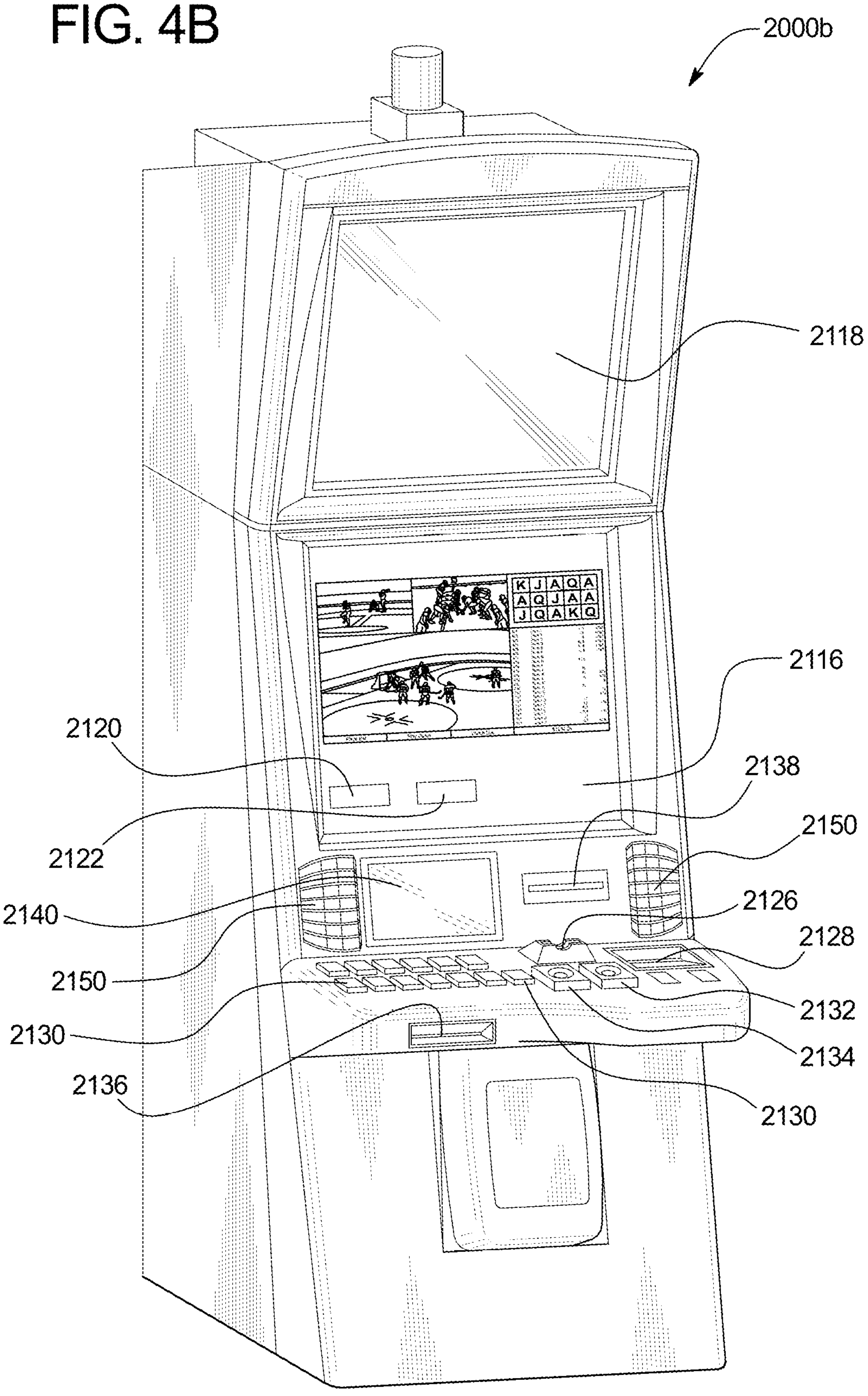
Figure 4C:
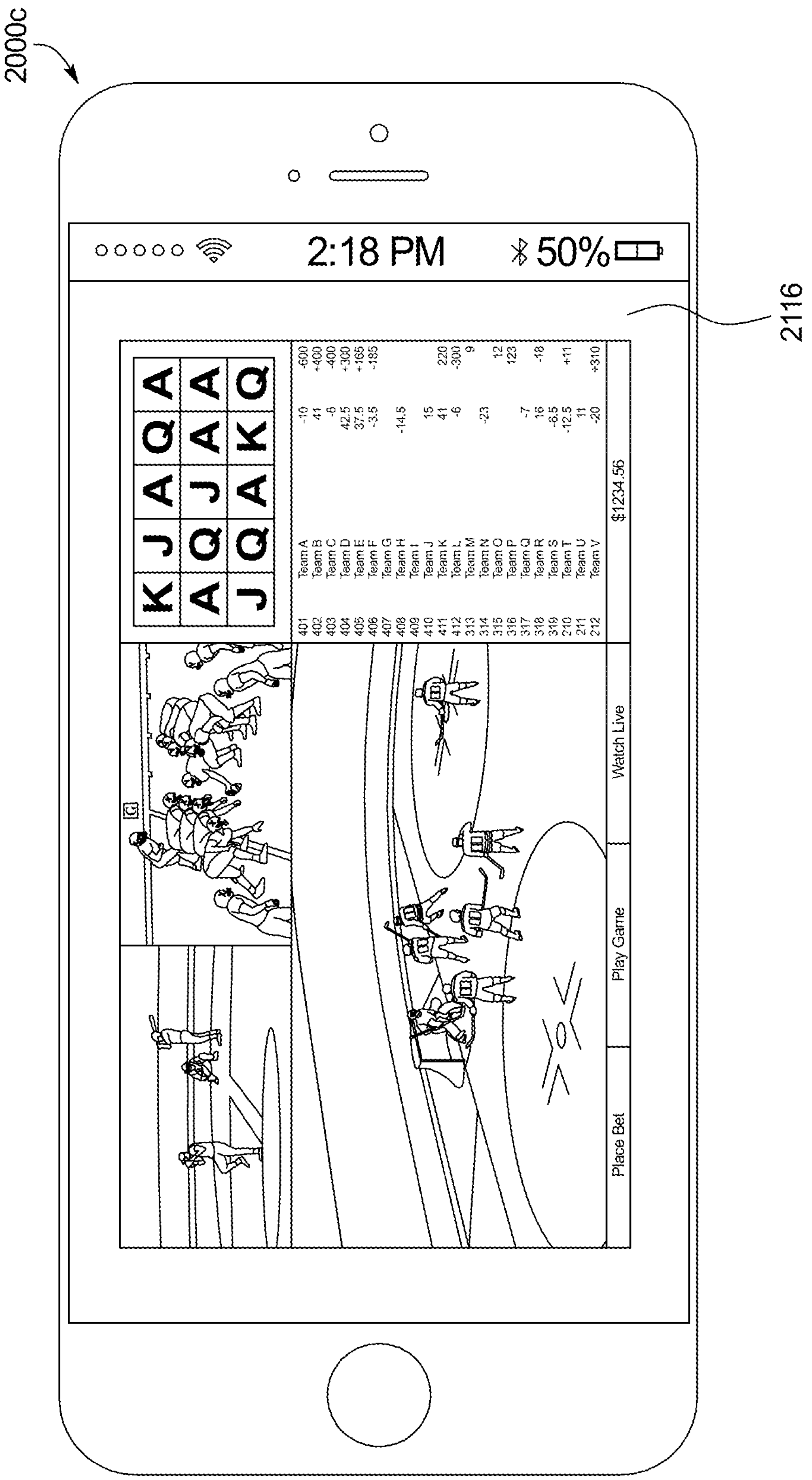
FIG. 4C is a front view of an example personal gaming device of the system of the present disclosure.

FIG. 3 is a block diagram of an example EGM 1000 and FIGS. 4A and 4B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices (such as personal gaming device 2000*c* of FIG. 4C) may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game conditions in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM of the present disclosure. In certain embodiments, the at least one memory device 1016 resides within the housing of the EGM (described below), while in other embodiments at least one component of the at least one memory device 1016 resides outside of the housing of the EGM. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device 1016 is configured to store, for example: (1) configuration software 1014, such as all the conditions and settings for a game playable on the EGM; (2) associations 1018 between configuration indicia read from an EGM with one or more conditions and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new conditions, new settings for existing conditions, new settings for new conditions, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, conditions, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, conditions, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 4A includes a central display device 2116, a player tracking display 2140, a credit display 2120, and a bet display 2122. The example EGM 2000*b* illustrated in FIG. 4B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000_a_ and 2000_b_ illustrated in FIGS. 4A and 4B each include a ticket printer and dispenser 2136.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000_a_ and 2000_b_ illustrated in FIGS. 4A and 4B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000_a_ and 2000_b_ illustrated in FIGS. 4A and 4B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000_a_ and 2000_b_ illustrated in FIGS. 4A and 4B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 4A and 4B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 4A and 4B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 4A and 4B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, such as the example EGMs 2000*a* and 2000*b* illustrated in FIGS. 4A and 4B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 4A and 4B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all systems, and these example EGMs may not include one or more elements that are included in other systems. For example, certain EGMs include a coin acceptor while others do not.

Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the system includes a server and a changeable EGM, the at least one memory device of the server stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the server is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the server to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards.

In certain embodiments in which the gaming system includes a server and an EGM, the EGM is configured to communicate with the server for monitoring purposes only. In such embodiments, the EGM determines the game outcome(s) and/or award(s) to be provided in any of the manners described above, and the server monitors the activities and events occurring on the EGM. In one such embodiment, the gaming system includes a real-time or online accounting and gaming information system configured to communicate with the server. In this embodiment, the accounting and gaming information system includes: (a) a player database configured to store player profiles, (b) a player tracking module configured to track players (as described below), and (c) a credit system configured to provide automated transactions.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award.

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a “BONUS” symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards.

In various embodiments, the system includes one or more player tracking systems. Such player tracking systems enable operators of the system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the system to begin a gaming session, the card reader reads the player identification number off the player tracking card to identify the player. The system timely tracks any suitable information or data relating to the identified player's gaming session. The system also timely tracks when the player tracking card is removed to conclude play for that gaming session. In another embodiment, rather than requiring insertion of a player tracking card into the card reader, the system utilizes one or more portable devices, such as a mobile phone, a radio frequency identification tag, or any other suitable wireless device, to track when a gaming session begins and ends. In another embodiment, the system utilizes any suitable biometric technology or ticket technology to track when a gaming session begins and ends.

In such embodiments, during one or more gaming sessions, the system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device.

Web-Based Gaming

In various embodiments, the system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique username and password combination, providing an input to a biometric sensor (e.g., a fingerprint sensor, a retinal sensor, a voice sensor, or a facial-recognition sensor), or providing any other suitable information.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer, by initiating creation of a paper check that is mailed to the player, or by initiating printing of a voucher at a kiosk in a gaming establishment.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the system includes an EGM configured to communicate with a personal gaming device-such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the system includes a geo-fence system that enables tethered game play within a particular geographic area but not outside of that geographic area.

Social Network Integration

In certain embodiments, the system is configured to communicate with a social network server that hosts or partially hosts a social networking website via a data network (such as the Internet) to integrate a player's gaming experience with the player's social networking account. This enables the system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the system to receive certain information from the social network server, such as the player's likes or dislikes or the player's list of connections. In certain embodiments, the system enables the player to link the player's player account to the player's social networking account(s). This enables the system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the system enables the player to recommend a game to the player's connections by posting a recommendation to the player's wall (or other suitable area) of the social networking website.

Differentiating Certain Gaming Systems from General Purpose Computing Devices

Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication-EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention claimed is:

1. A system comprising:

a processor; and a memory device that stores a plurality of instructions that, when executed by the processor, cause the processor to:

responsive to an occurrence of a sporting event wager identification event, determine if any of a plurality of sporting event wagers available to be placed qualify as a recommended sporting event wager, wherein the determination is based on first data associated with a first user and second data associated with a second user, the second user is different from the first user and, prior to the occurrence of the sporting event wager identification event, a predetermined relationship existed between the first user and the second user, and for each of any of the plurality of sporting event wagers available to be placed determined to qualify as the recommended sporting event wager:

communicate data which results in a display device displaying a notification of the recommended sporting event wager, and enable, via a first quantity of inputs associated with the first user, a placement of the recommended sporting event wager, wherein the first quantity of inputs is less than a second quantity of inputs associated with the second user placing the recommended sporting event wager.

2. The system of claim 1, wherein for each of the plurality of sporting event wagers available to be placed, the determination is further based on third data associated with that sporting event wager.

3. The system of claim 2, wherein the third data comprises data associated with the odds of that sporting event wager.

4. The system of claim 1, wherein for each of the plurality of sporting event wagers available to be placed, the determination is further based on third data associated with a sporting event.

5. The system of claim 1, wherein the first data associated with the first user comprises data associated with historic sporting event wagering activity of the first user.

6. The system of claim 1, wherein the second data associated with the second user comprises data associated with historic sporting event wagering activity of the second user.

7. The system of claim 1, wherein the second data associated with the second user comprises data associated with a success rate of historic sporting event wagers placed by the second user.

8. The system of claim 1, wherein the predetermined relationship existed between the second user and the first user based on the first user being enrolled to follow the second user.

9. The system of claim 1, wherein the memory device comprises a further plurality of instructions that, when executed for each of the plurality of sporting event wagers available to be placed, cause the processor to determine a score for that sporting event wager based on the first data and the second data, wherein the determination is based on the determined score of that sporting event wager relative to a threshold qualifying score.

10. A system comprising:

a processor; and a memory device that stores a plurality of instructions that, when executed by the processor, cause the processor to:

for a first sporting event wager available to be placed:

determine, based on first data associated with a first user, second data associated with a second user that is different from the first user, and third data associated with a parameter of the first sporting event wager, if that first sporting event wager qualifies as a first recommended sporting event wager, wherein, prior to the first sporting event wager being available to be placed, a predetermined relationship existed between the first user and the second user, and responsive to the first sporting event wager qualifying as the first recommended sporting event wager:

communicate data which results in a display device displaying a notification of the first recommended sporting event wager, and enable, via a first quantity of inputs associated with the first user, a placement of the first recommended sporting event wager, wherein the first quantity of inputs is less than a second quantity of inputs associated with the second user placing the first recommended sporting event wager, and for a second, different sporting event wager available to be placed:

determine, based on first data associated with the first user, fourth data associated with a third user that is different from the first user, and fifth data associated with a parameter of the second, different sporting event wager, if that second, different sporting event wager qualifies as a second recommended sporting event wager, wherein, prior to the second, different sporting event wager being available to be placed, a predetermined relationship existed between the first user and the third user, and responsive to the second, different sporting event wager qualifying as the second recommended sporting event wager:

communicate data which results in the display device displaying a notification of the second recommended sporting event wager, and enable, via a third quantity of inputs associated with the first user, a placement of the second recommended sporting event wager, wherein the third quantity of inputs is less than a fourth quantity of inputs associated with the third user placing the second recommended sporting event wager.

11. The system of claim 10, wherein the second user and the third user are different users.

12. A method of operating a system, the method comprising:

responsive to an occurrence of a sporting event wager identification event, determining, by a processor, if any of a plurality of sporting event wagers available to be placed qualify as a recommended sporting event wager, wherein the determination is based on first data associated with a first user and second data associated with a second user, the second user is different from the first user and prior to the occurrence of the sporting event wager identification event, a predetermined relationship existed between the first user and the second user, and for each of any of the plurality of sporting event wagers available to be placed determined to qualify as the recommended sporting event wager:

displaying, by a display device, a notification of the recommended sporting event wager, and enabling, by the processor and via a first quantity of inputs associated with the first user, a placement of the recommended sporting event wager, wherein the first quantity of inputs is less than a second quantity of inputs associated with the second user placing the recommended sporting event wager.

13. The method of claim 12, wherein for each of the plurality of sporting event wagers available to be placed, the determination is further based on third data associated with that sporting event wager.

14. The method of claim 13, wherein the third data comprises data associated with the odds of that sporting event wager.

15. The method of claim 12, wherein for each of the plurality of sporting event wagers available to be placed, the determination is further based on third data associated with a sporting event.

16. The method of claim 12, wherein the first data associated with the first user comprises data associated with historic sporting event wagering activity of the first user.

17. The method of claim 12, wherein the second data associated with the second user comprises data associated with historic sporting event wagering activity of the second user.

18. The method of claim 12, wherein the second data associated with the second user comprises data associated with a success rate of historic sporting event wagers placed by the second user.

19. The method of claim 12, wherein the predetermined relationship existed between the second user and the first user based on the first user being enrolled to follow the second user.

20. The method of claim 12, further comprising, for each of the plurality of sporting event wagers available to be placed, determining, by the processor, a score for that sporting event wager based on the first data and the second data, wherein the determination is based on the determined score of that sporting event wager relative to a threshold qualifying score.

* * * * *